(12) United States Patent
Jeong (10) Patent No.: US 6,757,163 B2
(45) Date of Patent: Jun. 29, 2004

(54) COMPUTER HAVING AN AUXILIARY MEMORY UNIT REMOVABLY FASTENED ON A FIXING BRACKET

(75) Inventor: Kyu-yeob Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 10/146,796

(22) Filed: May 17, 2002

(65) Prior Publication Data

US 2003/0095378 A1 May 22, 2003

(30) Foreign Application Priority Data

Nov. 19, 2001 (KR) ......................................... 2001-71843

(51) Int. Cl.[7] ................................................ G06F 1/16
(52) U.S. Cl. ...................... 361/685; 361/684; 361/801; 312/223.2
(58) Field of Search ................................ 361/683, 685, 361/724–727, 747, 730–733, 735; 312/223.1, 216, 223.2, 218, 251.1, 233, 330.1, 332.1, 334.13; 369/77.2, 75.1, 77.1; 248/220.31, 224.8, 60, 581, 609, 611, 500, 346.06, 229.16, 220.22; 360/137, 137 D, 900, 97.01, 98.01; 292/106, 31, 101, 175, 37, 42; 20/453, 525; 307/53

(56) References Cited

U.S. PATENT DOCUMENTS

| | | | |
|---|---|---|---|
| 4,688,131 A | * | 8/1987 | Noda et al. ................. 360/137 |
| 5,398,157 A | | 3/1995 | Paul |
| 5,801,920 A | * | 9/1998 | Lee .............................. 361/685 |
| 6,025,987 A | | 2/2000 | Allirot et al. |
| 6,249,430 B1 | | 6/2001 | Huang et al. |
| 6,293,636 B1 | * | 9/2001 | Le et al. ................... 312/223.2 |
| 6,297,952 B1 | * | 10/2001 | Liu et al. ..................... 361/685 |
| 6,370,022 B1 | * | 4/2002 | Hooper et al. .............. 361/685 |
| 6,377,447 B1 | * | 4/2002 | Boe ............................ 361/685 |
| 6,456,489 B1 | * | 9/2002 | Davis et al. ................. 361/684 |
| 6,473,313 B1 | * | 10/2002 | Chen et al. .................. 361/801 |

FOREIGN PATENT DOCUMENTS

| | | |
|---|---|---|
| JP | 1-149005 | 10/1989 |
| KR | 94-4052 | 2/1994 |
| KR | 94-4056 | 2/1994 |

* cited by examiner

Primary Examiner—Michael Datskovskiy
(74) Attorney, Agent, or Firm—Staas & Halsey LLP

(57) ABSTRACT

A computer including a casing mounted with an auxiliary memory unit having at least one fixing hole. The computer also comprises a fixing bracket accommodating and supporting the auxiliary memory unit, and having a through hole corresponding to a fixing hole of the auxiliary memory unit. A fixing member of the computer has a fixing projection inserted into the through hole of the fixing bracket and the fixing hole of the auxiliary memory unit to fasten the auxiliary memory unit on the fixing bracket. Thus, the computer has an auxiliary memory unit that is removably fastened on a fixing bracket without a screwdriver.

22 Claims, 12 Drawing Sheets

COMPUTER HAVING AN AUXILIARY MEMORY UNIT REMOVABLY FASTENED ON A FIXING BRACKET

CROSS-REFERENCE TO RELATED APPLICATIONS

This application claims the benefit of Korean Application No. 2001-71843, filed Nov. 19, 2001, in the Korean Intellectual Property Office, the disclosure of which is incorporated herein by reference.

BACKGROUND OF THE INVENTION

1. Field of the Invention

The present invention relates in general to a computer, and more particularly, to a computer for coupling auxiliary memory units to a fixing bracket.

2. Description of the Related Art

Generally, a computer is classified as a tower type (e.g., a stand type) or a desktop type, according to a shape of a casing of the computer.

Casings of both the tower type and desktop type computers, include a front panel forming a front part of the casing, a rear panel forming a rear part of the casing and having slots for a plurality of connectors, and a cover forming a housing space together with the front and rear panels. For the desktop type computer casing, the width of the casing is greater than the height thereof. In the tower type computer casing, the height is greater than the width. Hereinafter, the tower type computer casing will be described.

Figure 1:
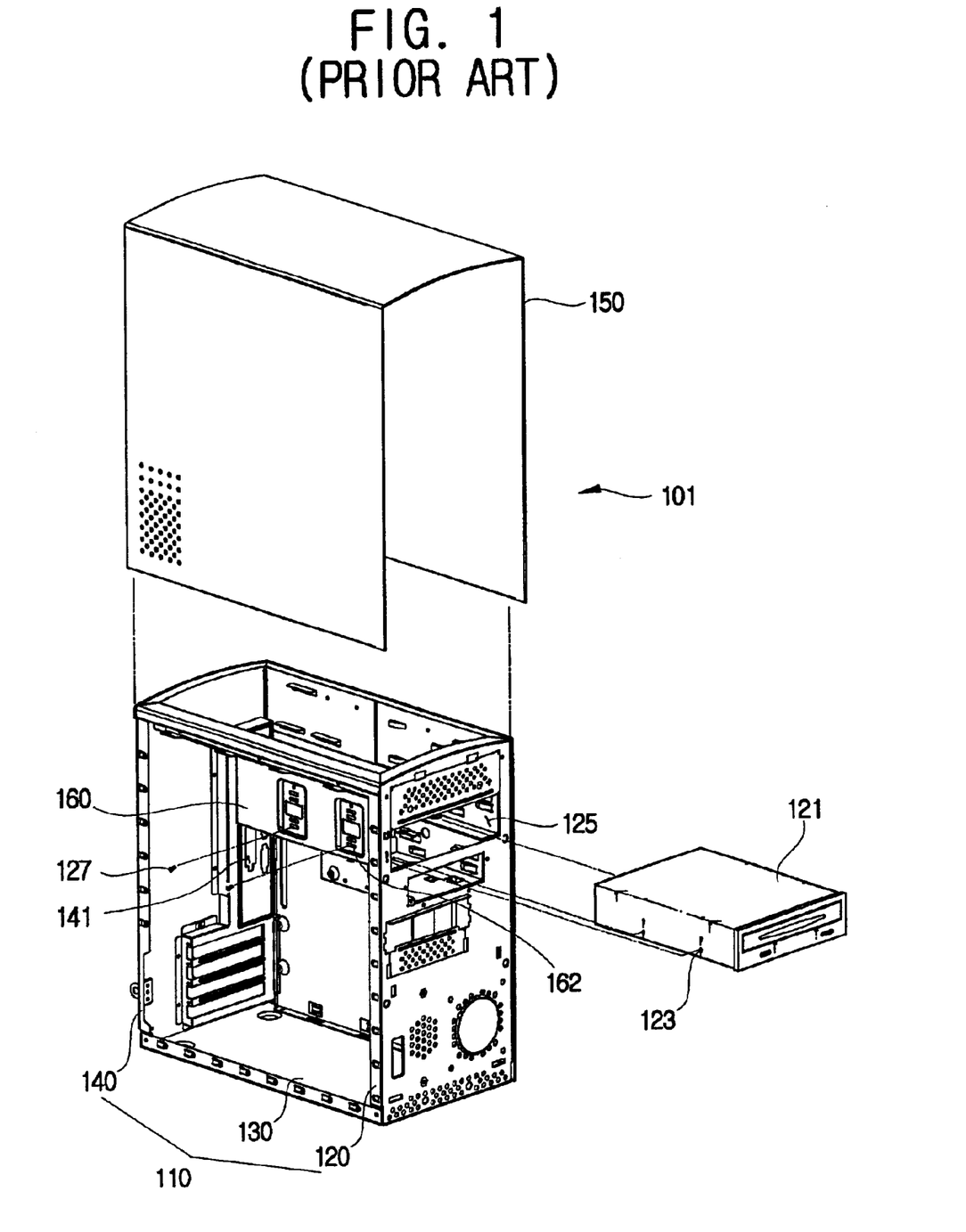
FIG. 1 is an exploded perspective view of the conventional computer casing.

As shown in FIG. 1, a computer system includes a main body 101 having a casing 110, a plurality of hardware components such as an auxiliary memory unit 121 accommodated in the casing 110, and a monitor (not shown) displaying a picture thereon, on the basis of a picture signal received from the main body 101.

The casing 110 includes a front panel 120 having openings 125 through which the auxiliary memory unit 121 (e.g., a CD-ROM drive, a floppy disk drive, etc.) is received. The casing 110 also includes a rear panel 140 having a plurality of slots 141 through which peripheral units such as the monitor are connected, a supporting panel 130 combining the front panel 120 with the rear panel 140 and forming a floor for the casing, and side walls between the front and rear panels 120 and 140. A cover 150 of the casing 110 forms a housing space together with the front, rear and supporting panels 120, 140 and 130.

A front of the front panel 120 has a power switch (not shown), a reset switch (not shown), and on a rear thereof, a fixing bracket 160 supporting the auxiliary memory unit 121.

Figure 2:
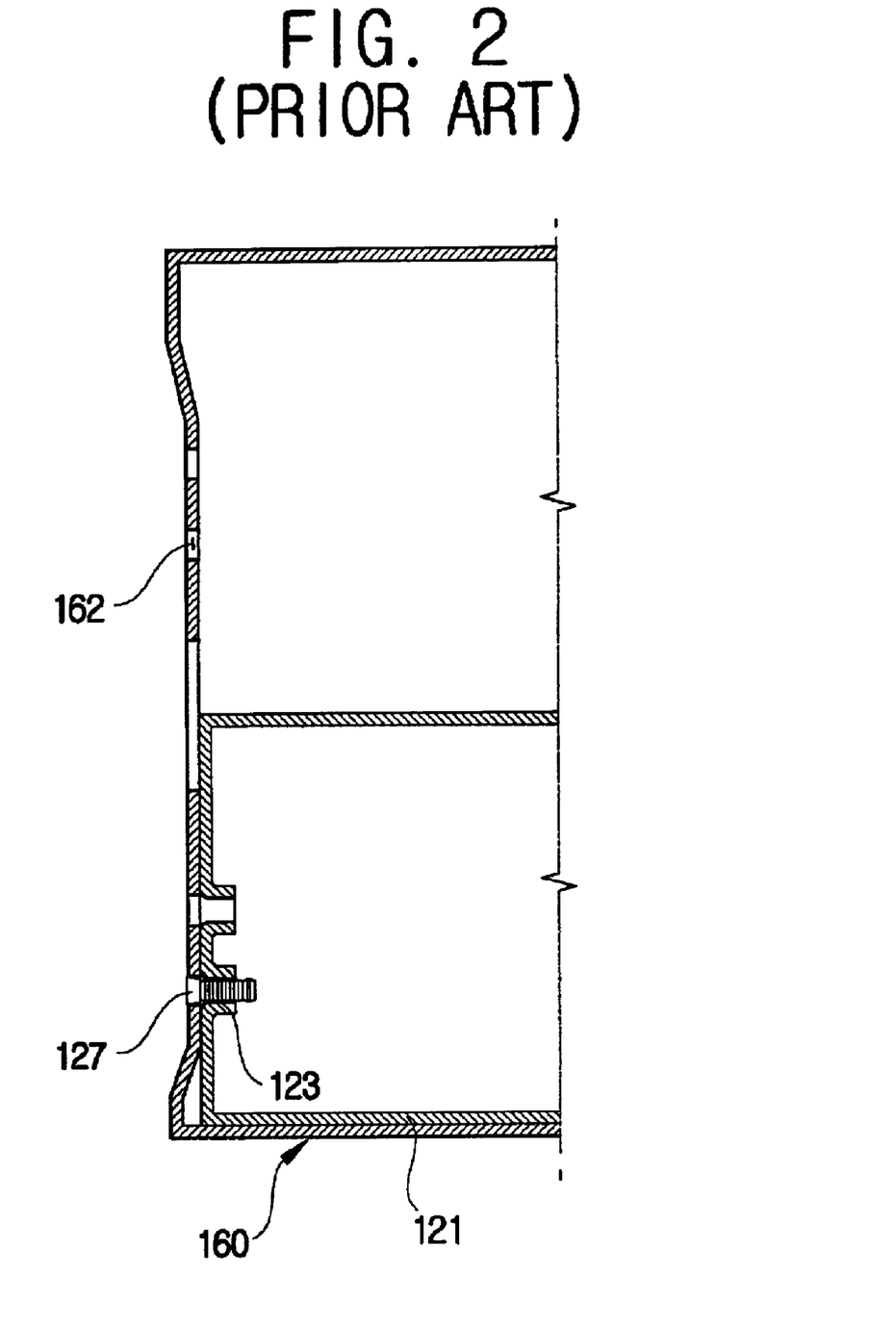
FIG. 2 is a partial sectional view illustrating the computer casing of FIG. 1 mounted with an auxiliary memory unit.

The fixing bracket 160 is made of steel and, as shown in FIGS. 1 and 2, has a box shape. A front end of the fixing bracket 160 is positioned on the front panel 120, and a rear end thereof, is positioned over a middle of the supporting panel 130. Further, side walls of the fixing bracket 160 are formed with a plurality of through holes 162 corresponding to screw holes 123 formed on the auxiliary memory unit 121 so that the auxiliary memory unit 121 is fastened on the fixing bracket 160 with bolts 127. Thus, the fixing bracket 160 selectively accommodates the auxiliary memory unit 121.

However, in the conventional computer casing, a screwdriver is needed to fasten and remove auxiliary memory units against a fixing bracket. Consequently, bolts used to fasten the auxiliary memory units on the fixing bracket are lost because the bolts are comparatively small.

SUMMARY OF THE INVENTION

Accordingly, it is an object of the present invention to provide a computer in which an auxiliary memory unit is removably fastened on a fixing bracket without a screwdriver.

Additional objects and advantages of the invention will be set forth in part in the description which follows and, in part, will be obvious from the description, or may be learned by practice of the invention.

The foregoing and other objects of the present invention are achieved by providing a computer including a casing mounted with an auxiliary memory unit having at least one fixing hole, a fixing bracket accommodating and supporting the auxiliary memory unit in the casing, and having a through hole corresponding to the fixing hole of the auxiliary memory unit, and a fixing member having a fixing projection inserted into the through hole of the fixing bracket and the fixing hole of the auxiliary memory unit so as to fasten the auxiliary memory unit on the fixing bracket.

According to an aspect of the invention, the computer includes a guiding groove on a surface of the fixing bracket and guiding the fixing member.

According to another aspect of the invention, the computer includes a fastening device removably fastening the fixing member on the fixing bracket.

According to another aspect of the invention, the fastening device has a pivot supporting part supporting a first end of the fixing member on the casing and a rotation part fastened on the fixing bracket by pivoting a second end of the fixing member on the pivot supporting part. The pivot supporting part has a holding part on the casing and a latch part that is on the fixing member and latched on the holding part. The rotation part has a hook holder on the fixing bracket and a hook on the fixing member to be locked in and released from the hook holder.

According to another aspect of the invention, the fixing member has a first part having the fixing projection and the latch part, and a second part removably coupled to the first part and having the hook. The first and second parts include a hook hole and a hook projection, respectively, which are removably coupled to each other along a lengthwise direction.

According to an aspect of the invention, the first part is made of metal and the second part is made of a plastic material having elasticity.

According to another aspect of the invention, the second part includes a handle.

BRIEF DESCRIPTION OF THE DRAWINGS

These and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals to like elements throughout.

Figure 3:
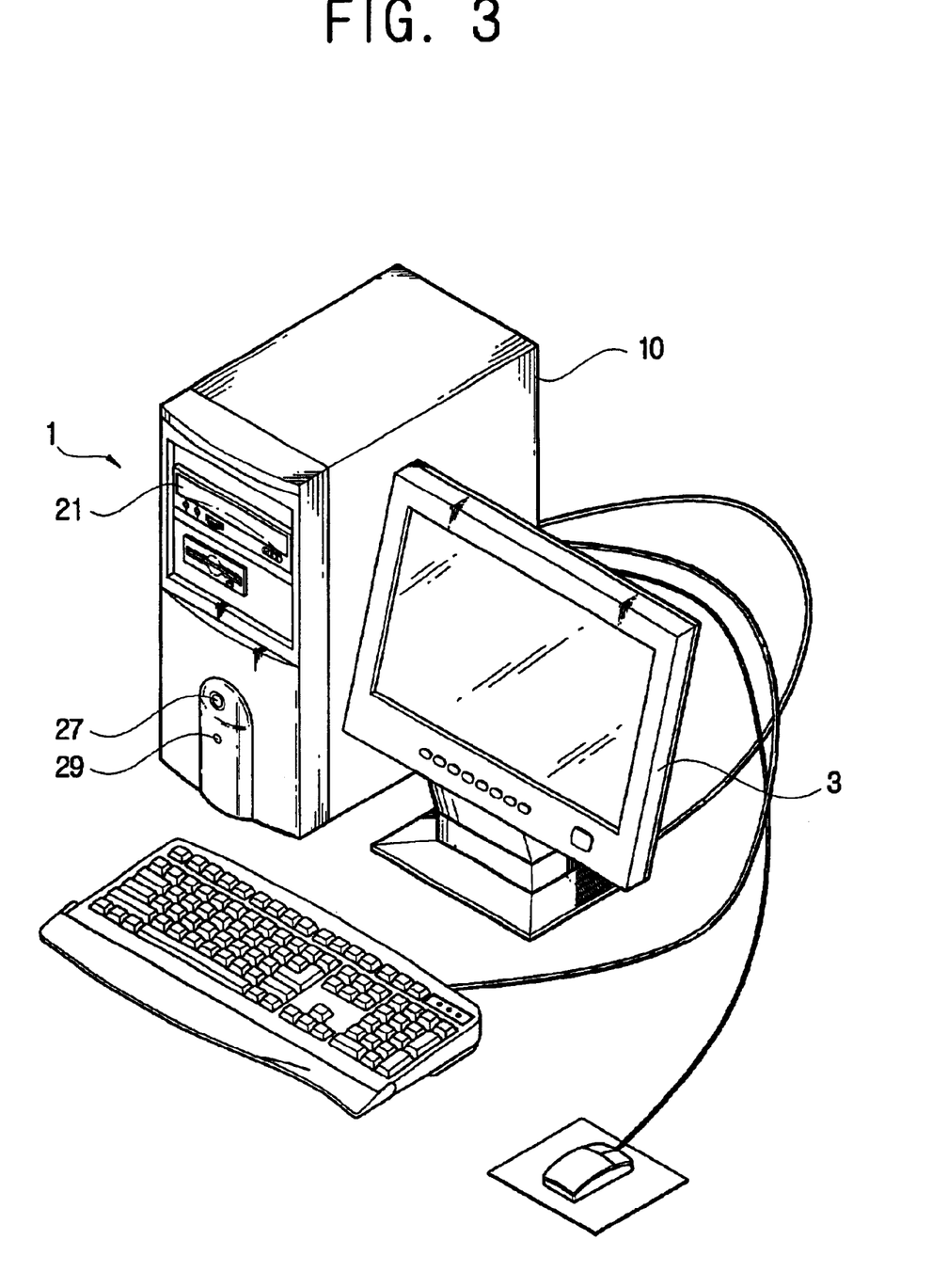
FIG. 3 is a perspective view of a computer system, according to an embodiment of the present invention.

As shown in FIG. 3, a computer system according to an embodiment of the present invention includes a main body 1 including a casing 10, a plurality of hardware components such as an auxiliary memory unit 21 accommodated in the casing 10, and a monitor 3 displaying a picture thereon on the basis of a picture signal received from the main body 1. Herein, the auxiliary memory unit 21 includes a CD-ROM drive, a DVD drive, a hard disk drive, or a floppy disk drive, which has a plurality of fixing holes 23 on the sides thereof (see FIG. 4).

Figure 4:
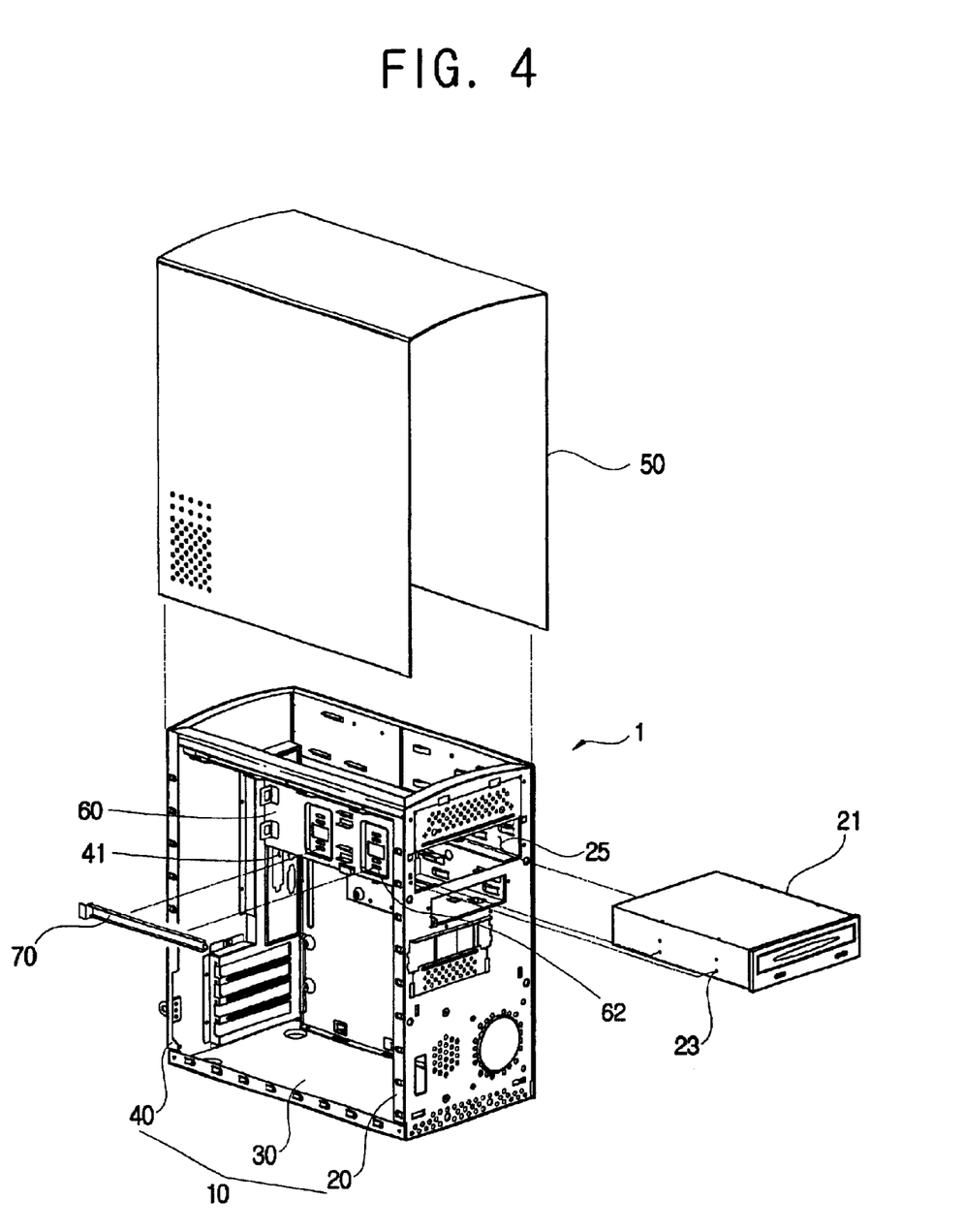
FIG. 4 is an exploded perspective view of a computer casing of the computer system shown in FIG. 3.

The casing 10 includes a front panel 20 having an opening 25 through which the auxiliary memory unit 21 is inserted. The casing 10 also includes a rear panel 40 having a plurality of slots 41 through which peripheral units such as the monitor are connected, a supporting panel 30 combining the front panel 20 with the rear panel 40 and forming a floor for the casing, side walls between the front and rear panels 20 and 40, and a cover 50 having an inverse "U" shape and forming a housing space together with the front, rear and supporting panels 20, 40 and 30.

A front of the front panel 20 has a power switch 27, a reset switch 29 (see FIG. 3), and on a rear thereof, a fixing bracket 60 supporting the auxiliary memory unit 21.

Figure 5:
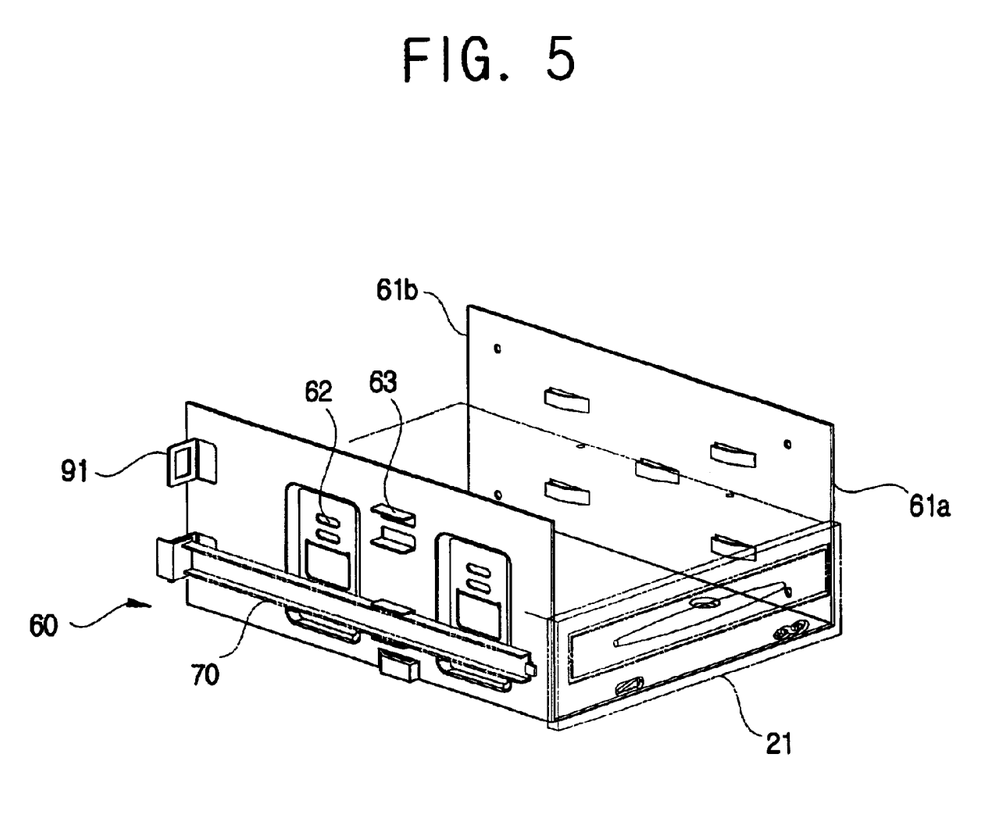
FIG. 5 is a perspective view of a fixing bracket of the computer system shown in FIG. 3.

The fixing bracket 60 is made of metal such as steel, and as shown in FIGS. 4 and 5, has a box shape. A front end 61a of the fixing bracket 60 is positioned on the front panel 20, and a rear end 61b thereof, is positioned over a middle of the supporting panel 30. Further, side walls of the fixing bracket 60 have a plurality of through holes 62, and a guiding groove 63 guiding a fixing member 70.

The through holes 62 are elongated holes formed at the side walls at positions corresponding to the fixing holes 23 of the auxiliary memory unit 21 which is accommodated in the fixing bracket 60. Thus, the fixing holes 23 are engaged with fixing projections 73 of the fixing member 70, thereby fixing the auxiliary memory unit 21 on the fixing bracket 60 (see FIG. 6A).

The casing 10 further includes the fixing member 70 to removably fasten the auxiliary memory unit 21 on the fixing bracket 60 without a screwdriver.

Figure 6A:
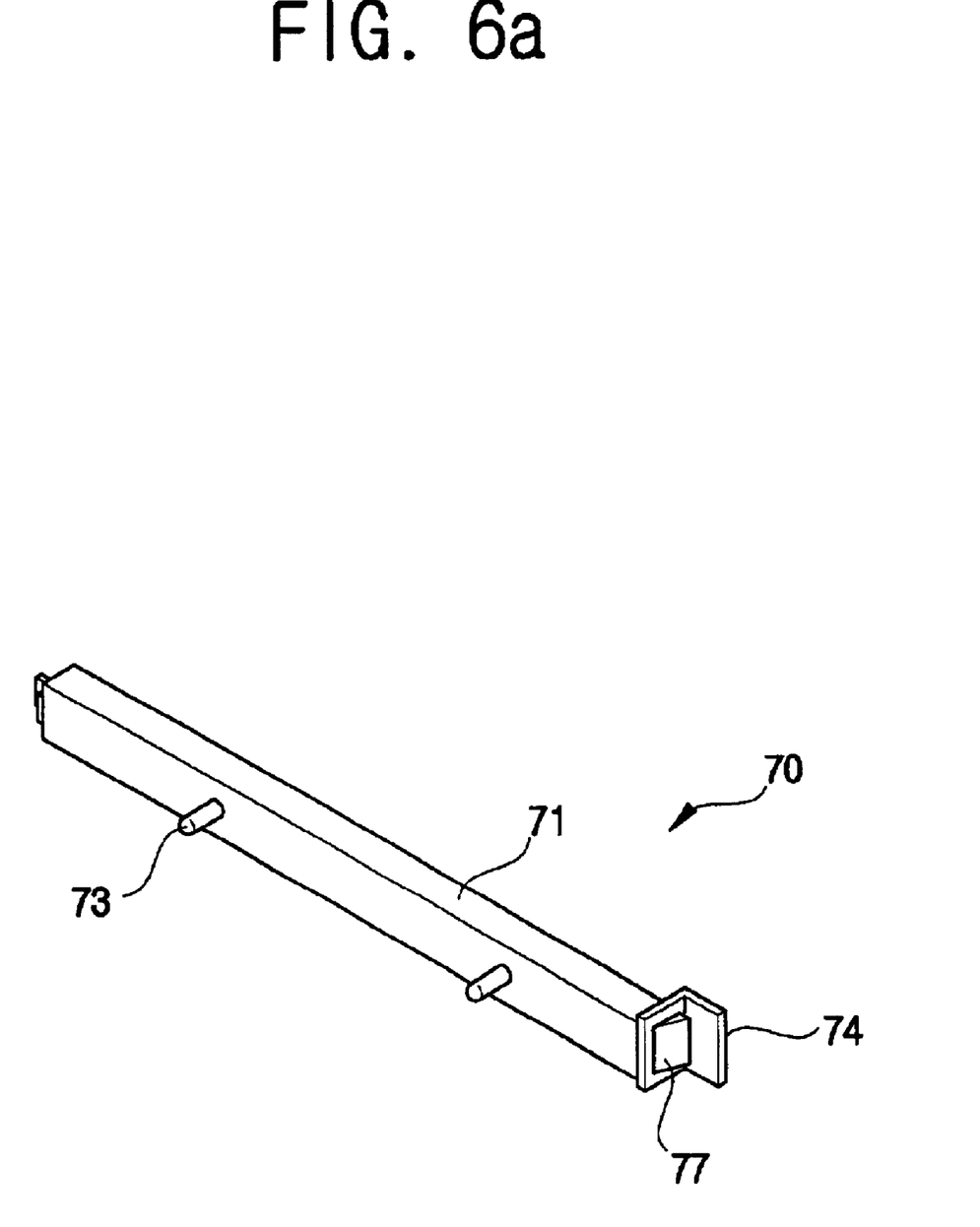
FIGS. 6A and 6B are perspective views of a fixing member of the computer system shown in FIG. 3.
Figure 6B:
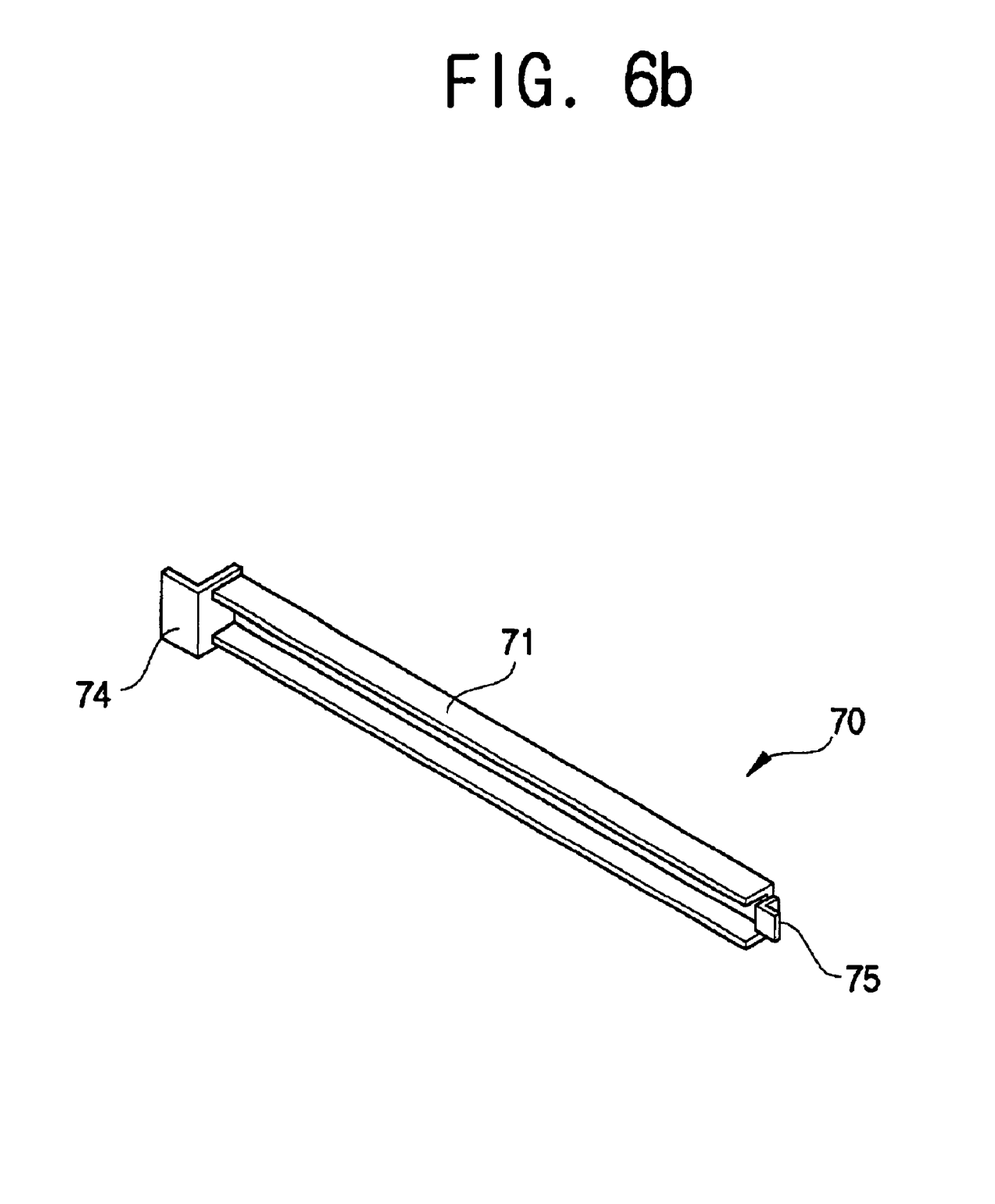

As shown in FIGS. 6A and 6B, the fixing member 70 has a bar shape as one body, including a main bar 71, and a pair of fixing projections 73 protruded from a surface of the main bar 71 and spaced from each other at a predetermined distance. Thus, the fixing projections 73 of the fixing member 70 are coupled to the fixing holes 23 of the auxiliary memory unit 21 accommodated in the fixing bracket 60, and are released from the fixing holes 23 so that the auxiliary memory unit 21 is locked to and released from the fixing bracket 60, respectively.

To prevent the fixing member 70 from being separated from the fixing bracket 60 when the fixing projections 73 of the fixing member 70 are coupled to the fixing holes 23 of the auxiliary memory unit 21, a fastening device is provided.

Figure 7:
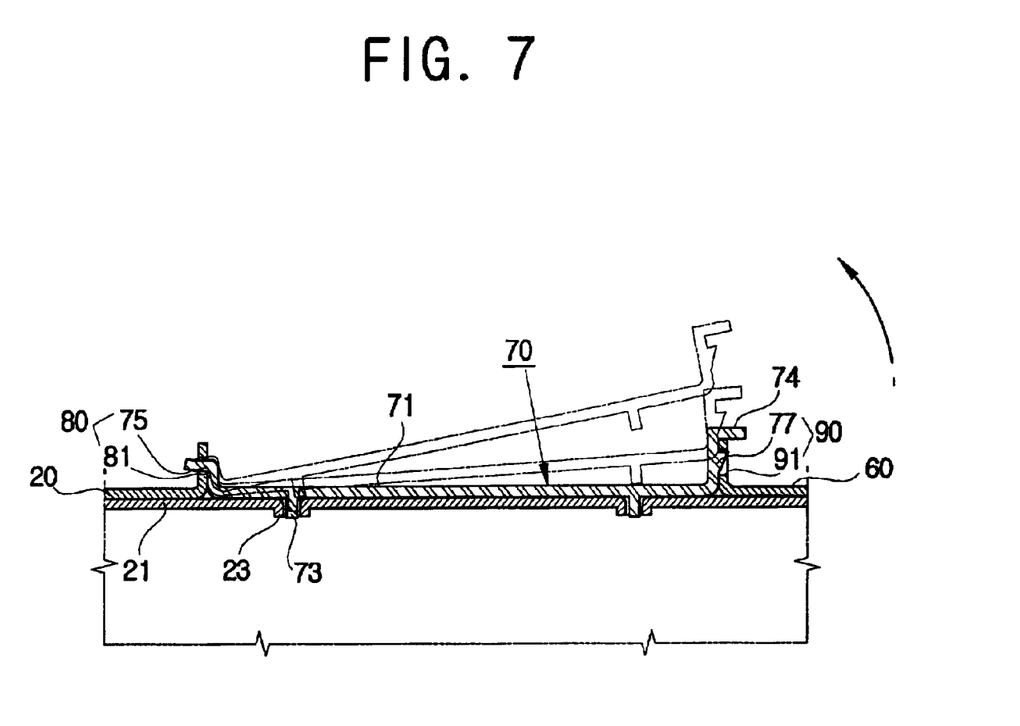
FIG. 7 is a partial sectional view of the computer system shown in FIG. 3 mounted with an auxiliary memory unit.

As shown in FIG. 7, the fastening device has a pivot supporting part 80 supporting a first end of the fixing member 70 on the casing 10 and a rotation part 90 fastened on the fixing bracket 60 by pivoting a second end of the fixing member 70 on the pivot supporting part 80.

The pivot supporting part 80 has a holding part 81 formed in the front panel 20 and a latch part 75 located at the first end of the fixing member 70 and inserted in the holding part 81. Thus, the latch part 75 of the fixing member 70 is latched on the holding part 81 of the front panel 20, so that the first end of the fixing member 70 is supported by the pivot supporting part 80.

The rotation part 90 has a hook holder 91 on the fixing bracket 60 and a hook 77 at the second end of the fixing member 70 to be locked in and released from the hook holder 91. Thus, the hook 77 is locked in the hook holder 91 after the latch part 75 is latched on the holding part 81 so that the fixing member 70 is fastened on the fixing bracket 60, thereby preventing separation of the fixing member 70.

The process of fastening the auxiliary memory unit 21 on the fixing bracket 60 without bolts is described below.

First, the auxiliary memory unit 21 is accommodated in the fixing bracket 60. Then the latch part 75 of the fixing member 70 is latched on the holding part 81 and the fixing projections 73 are inserted in the fixing holes 23 by pushing a handle 74 on the second end part of the fixing member 70 toward the fixing bracket 60. The second end of the fixing member 70 is pivoted on the pivot supporting part 80.

Simultaneously, the hook 77 of the fixing member 70 is locked in the hook holder 91 of the fixing bracket 60, thereby fastening the fixing member 70 on the fixing bracket 60. Further, the fixing projections 73 are coupled to the fixing holes 23 of the auxiliary memory unit 21, thereby fastening the auxiliary memory unit 21 on the fixing bracket 60 (see FIG. 7).

The process of removing the auxiliary memory unit 21 from the fixing bracket 60 is performed in a reverse order to the fastening order. Therefore, the auxiliary memory unit 21 is removed from the fixing bracket 60 without a screwdriver.

Figure 8A:
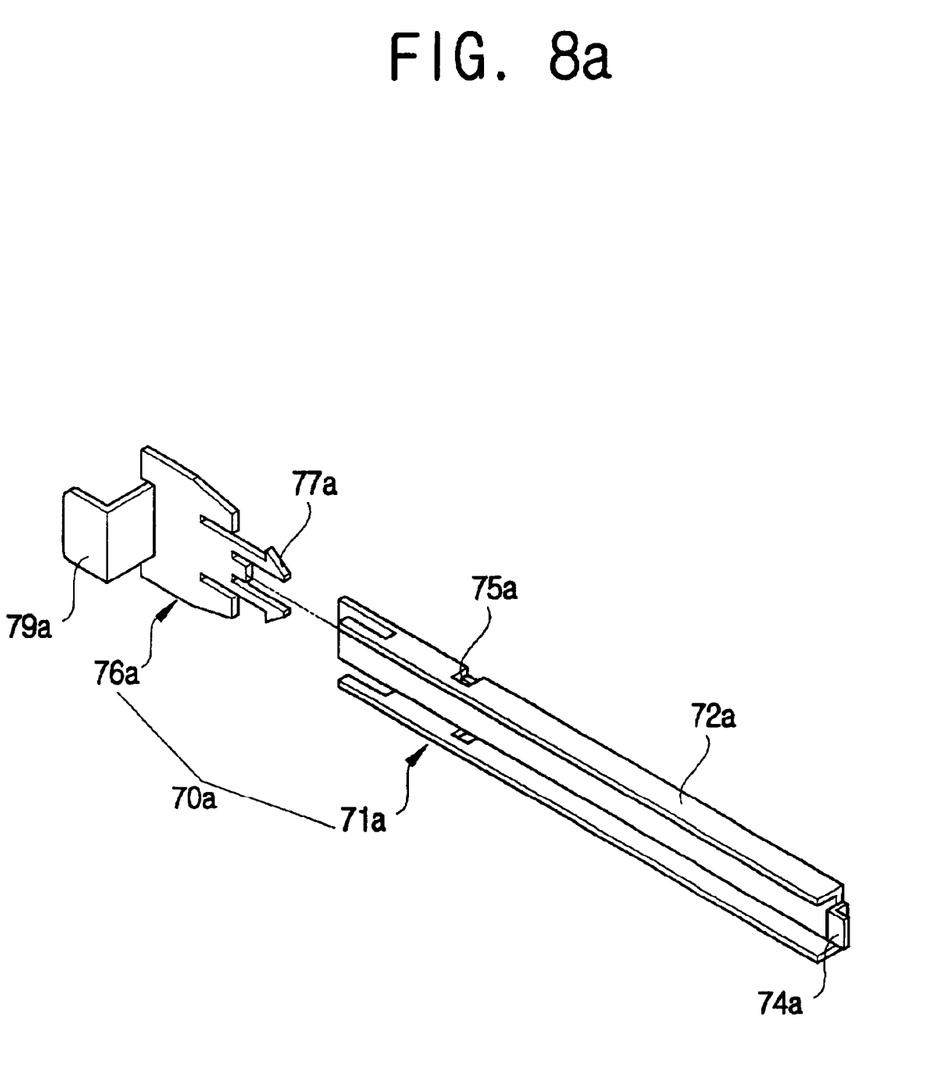
FIGS. 8A–8C are perspective views of a fixing member, according to an embodiment of the present invention.
Figure 8B:
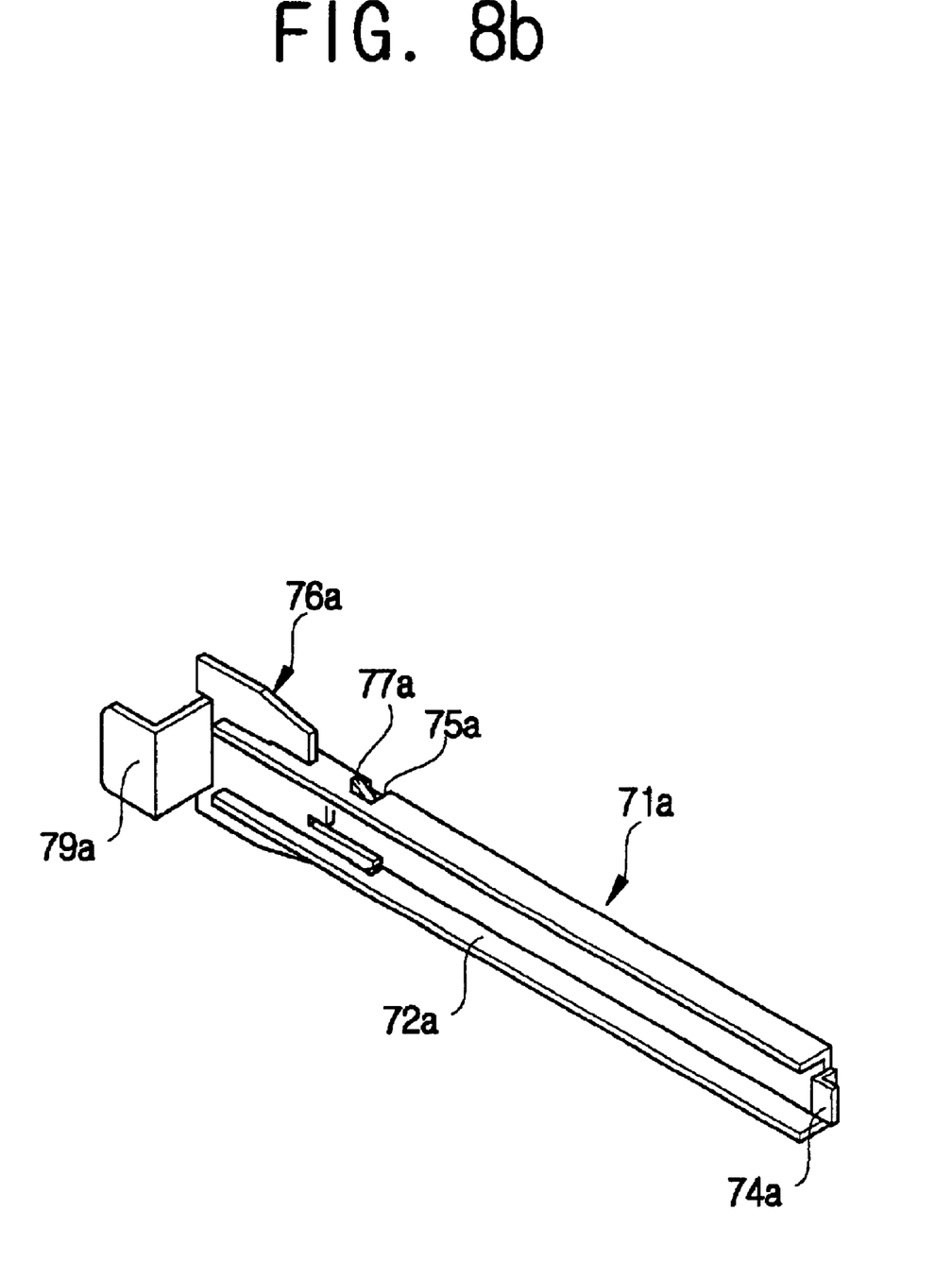
Figure 8C:
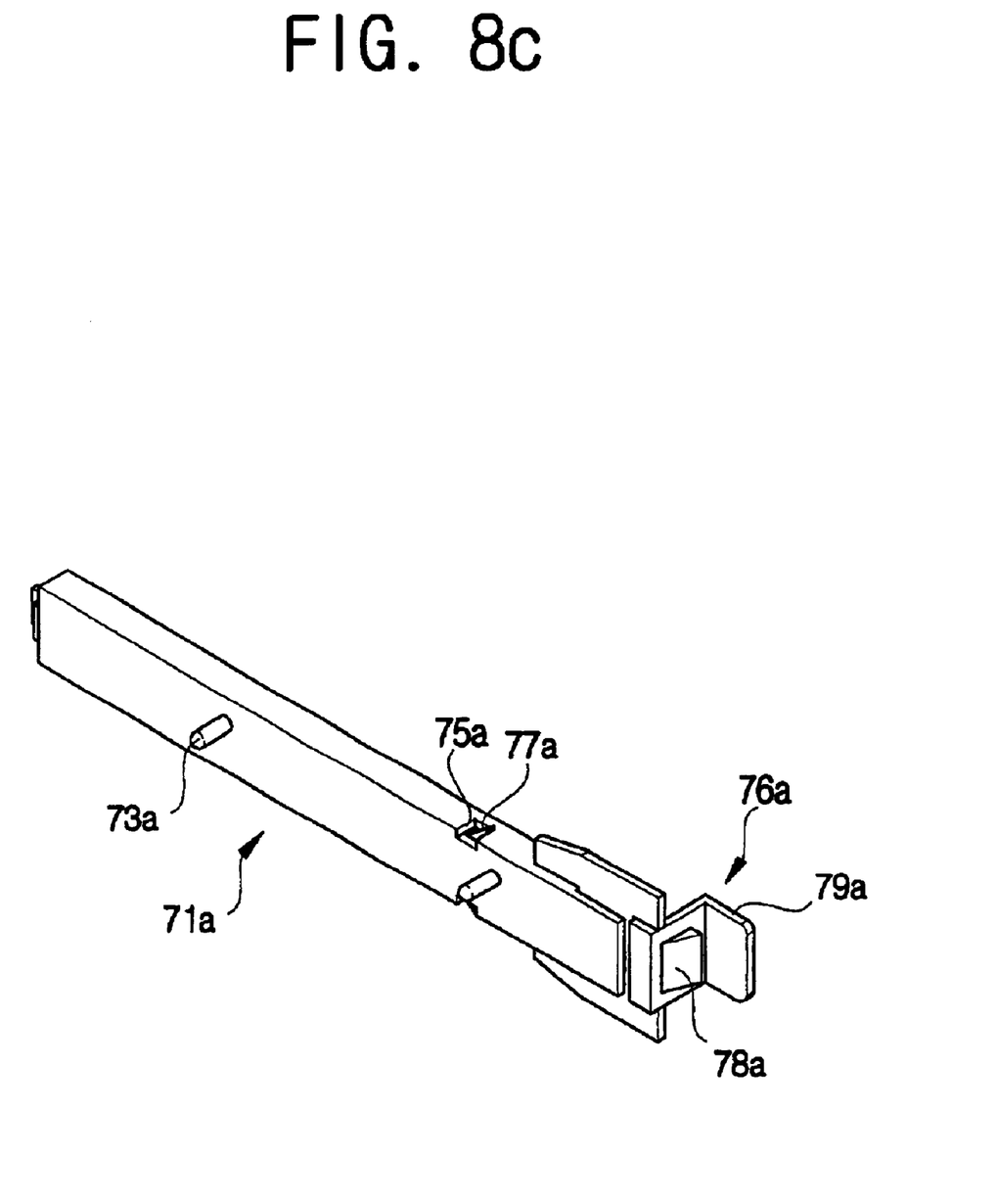

FIGS. 8A–8C are perspective views of a fixing member 70a, according to an embodiment of the present invention. As shown in FIGS. 8A–8C, the fixing member 70a is not made as one body. That is, for example, the fixing member 70a has a first part 71a and a second part 76a removably combined to the first part 71a.

The first part 71a is made of metal such as steel in a bar shape. The first part 71a has a main bar 72a, a pair of fixing projections 73a, protruded from a surface of the main bar 72a and spaced from each other at a predetermined distance, a latch part 74a to be latched on the holding part 81 of the fixing bracket 60, and hook holes 75a removably coupled to the second part 76a.

The latch part 74a is located at a first end of the main bar 72a and functions as a pivot by being latched on the holding part 81. The hook holes 75a adjacent to a second end of the main bar 72a, are removably coupled to the hook projections 77a of the second part 76a, thereby removably combining the first part 71a with the second part 76a (see FIG. 9).

The second part 76a is made of plastic material having elasticity. At one end of the second part 76a, the hook projections 77a are removably coupled to the hook holes 75a of the first part 71a. At the other end of the second part 76a, there is a hook 78a to be locked in the hook holder 91 of the fixing bracket 60 and a handle 79a which is bent from the hook 78a.

The process of fastening the auxiliary memory unit 21 on the fixing bracket 60 without bolts is described below.

Figure 9:
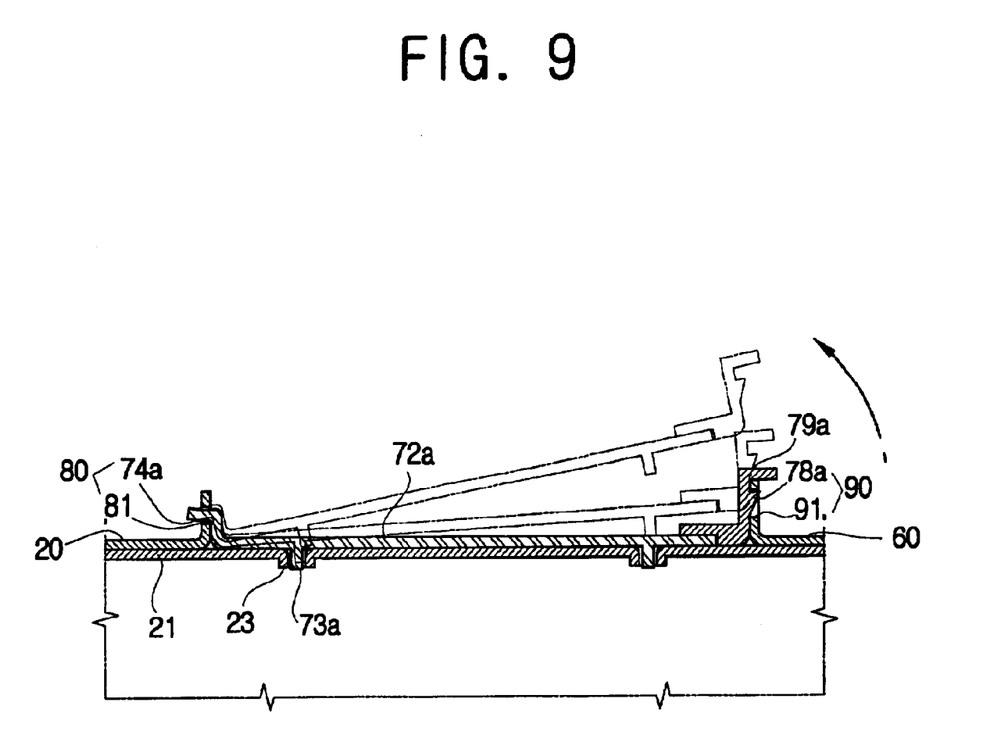
FIG. 9 is a partial sectional view of the computer mounted with an auxiliary memory unit, according to an embodiment of the present invention.

First, as shown in FIGS. 8B and 8C, the hook projections 77a of the second part 76a are combined to the hook holes 75a of the first part 71a. Thereafter, the auxiliary memory unit 21 is accommodated in the fixing bracket 60, and then, as shown in FIG. 9, the latch part 74a of the first part 71a is latched on the holding part 81 of the front panel 20.

Then, the fixing projections 73a are inserted in the fixing holes 23 by pushing the handle 79a of the second part 76a toward the fixing bracket 60. The second end of the fixing member 70a is pivoted on the pivot supporting part 80.

Simultaneously, the hook 78a of the second part 76a is locked in the hook holder 91 of the fixing bracket 60, thereby fastening the fixing member 70a on the fixing bracket 60. Further, the fixing projections 73a are coupled to the fixing holes 23 of the auxiliary memory unit 21, thereby fastening the auxiliary memory unit 21 on the fixing bracket 60 (see FIG. 9).

The process of removing the auxiliary memory unit 21 from the fixing bracket 60 is performed in a reverse order to the fastening order.

Thus, the fixing member 70a includes the first and second parts 71a and 76a, so that the auxiliary memory unit 21 is removably fastened on the fixing bracket 60 without a screwdriver.

In the above description, the fastening device includes the pivot supporting part 80 and the rotation part 90. However, the fastening device may be accomplished by using a pair of hooking structures.

Therefore, the present invention provides a computer in which an auxiliary memory unit is removably fastened on a fixing bracket without a screwdriver by a fixing member having fixing projections.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer comprising:
an auxiliary memory unit having at least one fixing hole;
a casing;
a fixing bracket mounted to the casing to accommodate and support the auxiliary memory unit, and having a through hole corresponding to the fixing hole of the auxiliary memory unit;
a fixing member having a fixing projection inserted into the through hole of the fixing bracket and the fixing hole of the auxiliary memory unit to removably fasten the auxiliary memory unit on the fixing bracket; and
a guiding groove on a surface of the fixing bracket to guide the fixing member.

2. The computer according to claim 1, further comprising;
a fastening device to removably fasten the fixing member on the fixing bracket.

3. The computer according to claim 2, wherein the fastening device comprises a pivot supporting part to support a first end of the fixing member on the fixing bracket, and a rotation part fastened on the fixing bracket by pivoting a second end of the fixing member on the pivot supporting part.

4. The computer according to claim 3, wherein the pivot supporting part comprises a holding part on the casing, and a latch part on the fixing member and latched on the holding part, and
the rotation part comprises a hook holder on the fixing bracket, and a hook formed on the fixing member to be locked in and released from the hook holder.

5. The computer according to claim 2, wherein the fixing member comprises a first part having the fixing projection and a latch part, and a second part removably coupled to the first part and having a hook.

6. The computer according to claim 3, wherein the fixing member comprises a first part having the fixing projection and a latch part, and a second part removably coupled to the first part and having a hook.

7. The computer according to claim 4, wherein the fixing member comprises a first part having the fixing projection and the latch part, and a second part removably coupled to the first part and having the hook.

8. The computer according to claim 5, wherein the first part comprises hook holes and the second part comprises a hook projection, which are removably coupled to each other along a lengthwise direction.

9. The computer according to claim 6, wherein the first part comprises hook holes and the second part comprises a hook projection, which are removably coupled to each other along a lengthwise direction.

10. The computer according to claim 7, wherein the first part comprises hook holes and the second part comprises a hook projection, which are removably coupled to each other along a lengthwise direction.

11. The computer according to claim 5, wherein the first part is made of metal and the second part is made of a plastic material having elasticity.

12. The computer according to claim 6, wherein the first part is made of metal and the second, part is made of a plastic material having elasticity.

13. The computer according to claim 7, wherein the first part is made of metal and the second part is made of a plastic material having elasticity.

14. The computer according to claim 5, wherein the second part comprises a handle.

15. The computer according to claim 6, wherein the second part comprises a handle.

16. The computer according to claim 7, wherein the second part comprises a handle.

17. An apparatus having an auxiliary memory unit removably mounted to a computer casing and having at least one fixing hole, said apparatus comprising:
a fixing bracket mounted to the casing to accommodate and support the auxiliary memory unit, and having a through hole corresponding to the fixing hole of the auxiliary memory unit;
a fixing member having fixing projections inserted into the through hole of the fixing bracket and the fixing hole of the auxiliary memory unit to removably fasten the auxiliary memory unit on the fixing bracket; and
a guiding groove on a surface of the fixing bracket to guide the fixing member.

18. The apparatus according to claim 17, wherein the auxiliary memory unit is accommodated in the fixing bracket.

19. The apparatus according to claim 17, wherein the fixing projections are coupled to and released from the fixing hole of the auxiliary memory unit so that the auxiliary memory unit is locked to and released from the fixing bracket, respectively.

20. The apparatus according to claim 17, wherein the fixing member comprises a main bar in which the fixing projections protrude therefrom and are spaced from each other at a predetermined distance.

21. An apparatus having an auxiliary memory unit removably mounted to a computer casing and having at least one fixing hole, said apparatus comprising:

a fixing bracket mounted to the casing to accommodate and support the auxiliary memory unit, and having a through hole corresponding to the fixing hole of the auxiliary memory unit;

a fixing member having fixing projections inserted into the through hole of the fixing bracket and the fixing hole of the auxiliary memory unit to removably fasten the auxiliary memory unit on the fixing bracket; and a fastening device to removably fasten the fixing member on the fixing bracket, the fastening device having a pivot supporting part to support a first end of the fixing member, and a rotation part fastened on the fixing bracket by pivoting a second end of the fixing member on the pivot supporting part.

22. The apparatus according to claim 21, wherein the pivot supporting part comprises a holding part, and a latch part which is formed on the fixing member and latched on the holding part, and the rotation part comprises a hook holder on the fixing bracket, and a hook formed on the fixing member to be locked in and released from the hook holder, thereby removably fastening the auxiliary memory unit on the fixing bracket.

\* \* \* \* \*